(12) United States Patent
Aguilar

(10) Patent No.: US 7,563,079 B2
(45) Date of Patent: *Jul. 21, 2009

(54) BORE AND SHAFT ASSEMBLY

(75) Inventor: Scott Grover Aguilar, La Cresenta, CA (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/474,179

(22) Filed: Jun. 23, 2006

(65) Prior Publication Data

US 2006/0236694 A1     Oct. 26, 2006

Related U.S. Application Data

(63) Continuation of application No. 10/884,232, filed on Jul. 3, 2004, now Pat. No. 7,066,719.

(51) Int. Cl.
| | |
|---|---|
| F04B 17/00 | (2006.01) |
| F01D 25/00 | (2006.01) |
| F01D 11/00 | (2006.01) |
| F01D 25/16 | (2006.01) |
| F16J 15/447 | (2006.01) |
| F16J 9/12 | (2006.01) |
| F16J 15/44 | (2006.01) |
| F16J 15/34 | (2006.01) |

(52) U.S. Cl. .................. 417/407; 415/229; 415/230; 415/111; 277/419; 277/500

(58) Field of Classification Search ......... 417/406–407; 415/229, 230, 111, 175; 277/387, 499, 360, 277/411, 500, 419, 585–586, 422
See application file for complete search history.

(56) References Cited

U.S. PATENT DOCUMENTS 2,859,986 A     11/1958     Josephson ................... 277/585

(Continued)

FOREIGN PATENT DOCUMENTS

EP     1507106 A1 *    2/2005

(Continued)

OTHER PUBLICATIONS

PCT Notification of Transmittal of The International Search Report; Jan. 31, 2006.

(Continued)

*Primary Examiner*—Thai Ba Trieu
(74) *Attorney, Agent, or Firm*—Lee & Hayes

(57) ABSTRACT

An exemplary system for a turbomachine includes a bore extending from an inner end to an outer end with an inner seat proximate to the inner end and an outer seat proximate to the outer end, a rotatable shaft with an inner slot and an outer slot, an outer seal ring capable of being received by the outer slot and capable of being seated in the outer seat and an inner seal ring capable of being received by the inner slot, capable of bridging the outer seat and capable of being seated in the inner seat where an axial width of the inner seal ring exceeds an axial width of the outer seal ring. Various other exemplary devices, systems, methods, etc., are also disclosed.

13 Claims, 4 Drawing Sheets

U.S. PATENT DOCUMENTS

| | | | | |
|---|---|---|---|---|
| 3,462,159 | A | * | 8/1969 | Baumann et al. ............ 277/422 |
| 3,695,621 | A | | 10/1972 | Damratowski et al. ...... 277/422 |
| 4,171,137 | A | | 10/1979 | Aizu et al. ................. 415/111 |
| 4,196,910 | A | | 4/1980 | Aizu ......................... 417/407 |
| 4,198,063 | A | | 4/1980 | Shimizu et al. ............. 417/407 |
| 4,289,264 | A | * | 9/1981 | Rawlins ..................... 277/460 |
| 4,296,934 | A | | 10/1981 | Atkin ........................ 277/411 |
| 4,447,062 | A | | 5/1984 | Leicht ....................... 277/419 |
| 4,504,069 | A | * | 3/1985 | Stenlund .................... 277/422 |
| 4,691,927 | A | | 9/1987 | Sudol et al. ................ 277/360 |
| 4,865,332 | A | | 9/1989 | Ruetz ........................ 277/347 |
| 5,129,782 | A | | 7/1992 | Ruetz ........................ 277/387 |
| 5,584,512 | A | | 12/1996 | Carstensen ................. 285/55 |
| 5,673,923 | A | | 10/1997 | Watanabe et al. ........... 277/500 |
| 5,934,685 | A | | 8/1999 | Danzer ...................... 277/499 |
| 6,017,184 | A | | 1/2000 | Aguilar et al. ............. 417/407 |
| 6,398,484 | B1 | | 6/2002 | Orikasa et al. ............. 415/111 |
| 6,406,253 | B2 | | 6/2002 | Heyes ........................ 415/111 |
| 7,066,719 | B2 | | 9/2006 | Honeywell .................. 277/419 |
| 2004/0057847 | A1 | | 3/2004 | Wild ......................... 417/407 |
| 2004/0120835 | A1 | | 6/2004 | O'Hara ...................... 417/407 |
| 2005/0116426 | A1 | | 6/2005 | Watanabe et al. ........... 277/419 |
| 2008/0260521 | A1 | * | 10/2008 | Werro et al. ............. 415/170.1 |

FOREIGN PATENT DOCUMENTS

| | | |
|---|---|---|
| JP | 201165322 | 6/2001 |
| WO | WO9501523 | 1/1995 |
| WO | WO 2008087122 A1 * | 7/2008 |

OTHER PUBLICATIONS

PCT Written Opinion of the International Searching Authority; Jan. 31, 2006.

IHI paper on Turbines.

\* cited by examiner

BORE AND SHAFT ASSEMBLY

RELATED APPLICATIONS

This application is a continuation of U.S. patent application Ser. No. 10/884,232, entitled "Bore and Shaft Assembly", filed on Jul. 3, 2004 (now U.S. Pat. No. 7,066,719), which is incorporated by reference herein. This application is related to U.S. patent application Ser. No. 11/474,222, filed concurrently herewith (Jun. 23, 2006), which is incorporated by reference herein and which is a divisional application of aforementioned U.S. patent application Ser. No. 10/884,232 (now U.S. Pat. No. 7,066,719).

TECHNICAL FIELD

Subject matter disclosed herein relates generally to turbomachinery for internal combustion engines and, in particular, seals for rotating turbomachinery shafts.

BACKGROUND

Most turbines include a shaft that extends from a hub of a turbine wheel to a shaft bearing. For example, turbines for internal combustion engines typically include a turbine wheel housing that directs exhaust of an engine to a turbine wheel and another housing that houses a bearing for a shaft coupled to the turbine wheel. In such an arrangement, the bearing exists in a lubricant environment that lubricates the bearing to reduce frictional forces, dampen vibration, etc., to thereby allow for high speed operation of the turbine and the turbine wheel exists in an exhaust environment typically characterized by high temperatures, high pressures and, depending on nature of the exhaust, corrosive reaction chemistry. To separate these two environments, a variety of seal mechanisms have been proposed and used.

In general, such seal mechanisms aim to reduce flow of exhaust to the lubricant environment and/or flow of lubricant to the exhaust environment, both of which can be detrimental to performance (e.g., efficiency, emissions, longevity, etc.). Flow of exhaust to the lubricant environment is usually referred to as "blowby" and flow of lubricant to the exhaust environment is usually referred to as "leakage". Blowby typically occurs during high speed operation or load where a significant positive pressure differential exists between the exhaust environment and the lubricant environment. Leakage typically occurs during low turbine-power modes of operation, such as at engine idle, where the pressure differential is negative and/or minimal and insufficient to overcome capillary or other lubricant transport forces.

As the turbomachinery industry trends toward increased turbine inlet pressures, more stringent emission regulations, closed-crankcase ventilation systems, and increased customer sensitivity to the passage of exhaust gas through the turbine seal, a need for seal mechanisms that reduce blowby and/or leakage will increase, and the design of such mechanisms will become more challenging. Various exemplary seal mechanisms disclosed herein aim to reduce blowby and/or leakage. Further, various exemplary seal mechanism may allow for increased performance (e.g., efficiency, emissions, longevity, etc.), assembly and/or disassembly of turbomachinery.

BRIEF DESCRIPTION OF THE DRAWINGS

A more complete understanding of the various methods, devices, systems, arrangements, etc., described herein, and equivalents thereof, may be had by reference to the following detailed description when taken in conjunction with the accompanying drawings wherein.

DETAILED DESCRIPTION

Various exemplary methods, devices, systems, arrangements, etc., disclosed herein address issues related to technology associated with turbochargers and are optionally suitable for use with electrically assisted turbochargers.

Figure 1:
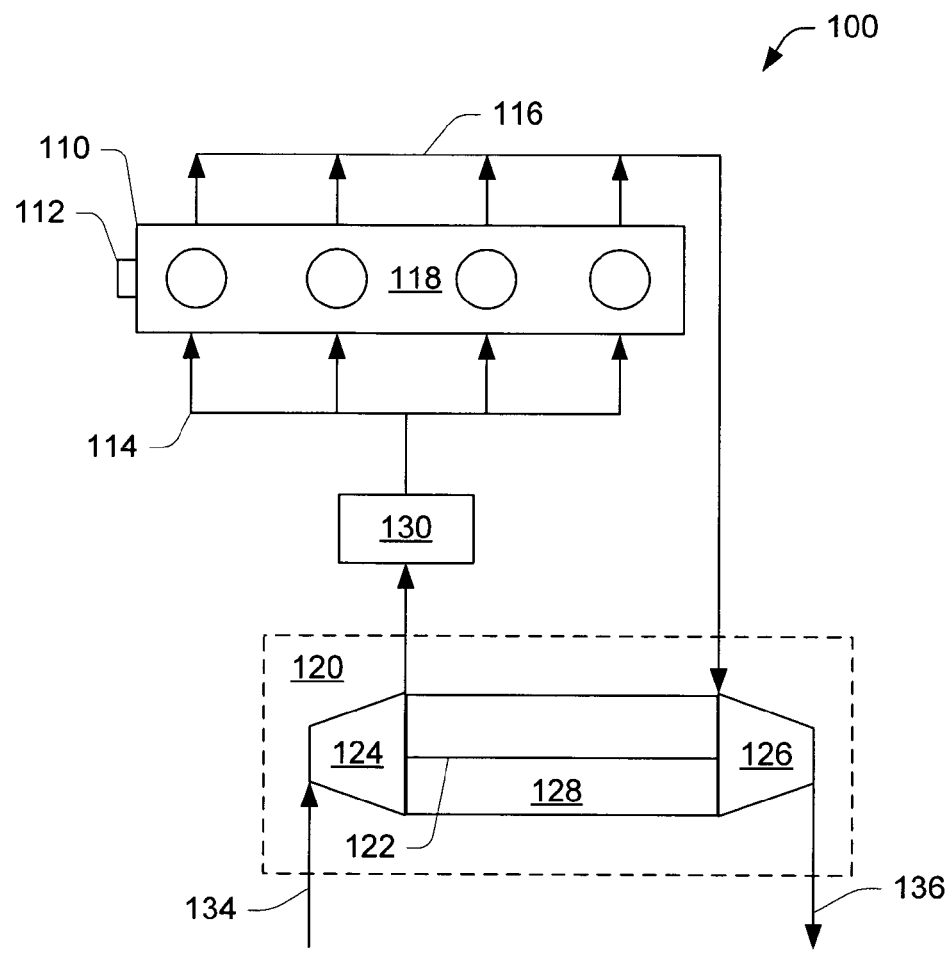
FIG. 1 is a diagram of a conventional turbocharger and internal combustion engine.

Turbochargers are frequently utilized to increase the output of an internal combustion engine. Referring to FIG. 1, a prior art system 100, including an internal combustion engine 110 and a turbocharger 120 is shown. The internal combustion engine 110 includes an engine block 118 housing one or more combustion chambers that operatively drive a shaft 112. As shown in FIG. 1, an intake port 114 provides a flow path for air to the engine block 118 while an exhaust port 116 provides a flow path for exhaust from the engine block 118.

The turbocharger 120 acts to extract energy from the exhaust and to provide energy to intake air, which may be combined with fuel to form combustion gas. As shown in FIG. 1, the turbocharger 120 includes an air inlet 134, a shaft 122, a compressor 124, a turbine 126, a center housing or assembly 128 and an exhaust outlet 136.

The output of the compressor 124 flows to a heat exchanger (e.g., cooler) 130 that is typically used to extract heat from the compressed intake air prior to the intake port 114 of the engine 110. As mentioned in the Background section, compression causes friction between air molecules and hence frictional heating. Thus, air at a compressor outlet generally has a considerably higher temperature than air at a compressor inlet. In FIG. 1, the heat exchanger 130 is typically an intercooler that acts to remove heat from compressed air before the compressed air reaches one or more combustion chambers of the engine 110.

Referring to the turbine 126, such a turbine optionally includes a variable geometry unit and a variable geometry controller. The variable geometry unit and variable geometry controller optionally include features such as those associated with commercially available variable geometry turbochargers (VGTs), such as, but not limited to, the GARRETT® VNT™ and AVNT™ turbochargers, which use multiple adjustable vanes to control the flow of exhaust across a turbine. Of course, an exemplary turbocharger may employ wastegate technology as an alternative or in addition to variable geometry technology.

Figure 2:
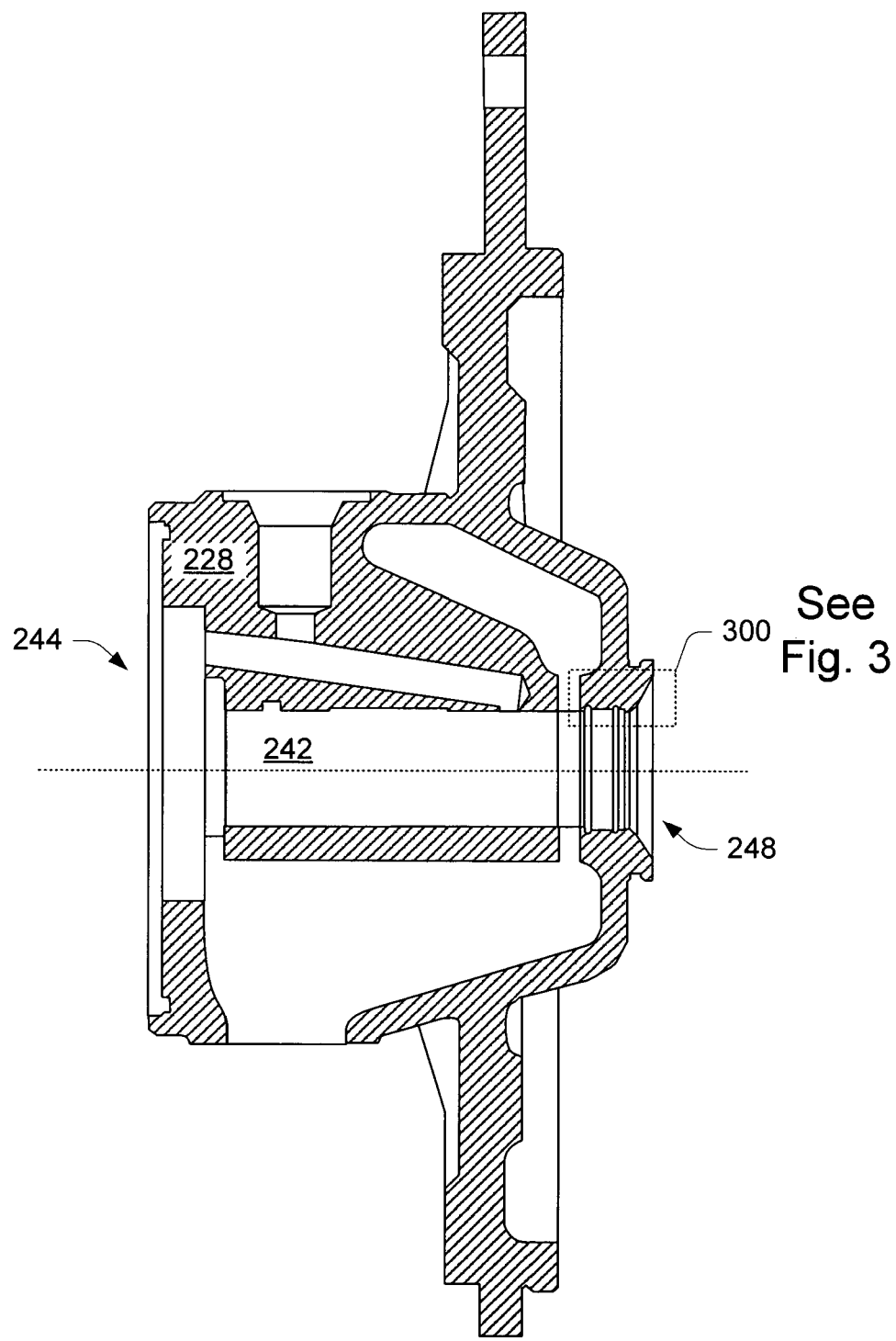
FIG. 2 is a cross-sectional view of an exemplary housing of a turbocharger.

FIG. 2 shows a cross-section of an exemplary housing 228 for housing a bearing to support a turbine wheel shaft. The exemplary housing 228 is optionally suitable for use as the housing 128 of FIG. 1. The exemplary housing 228 includes a through bore 242 that includes a compressor bore end or segment 244 and a turbine bore end or segment 248. In general, such a through bore has a longitudinal axis that is coaxial with the axis of rotation of a turbine wheel and a compressor wheel. A dashed box indicates an exemplary seal mechanism 300 of the turbine bore segment 248 of the bore 242 that is shown in more detail in FIG. 3 along with additional components.

Figure 3:
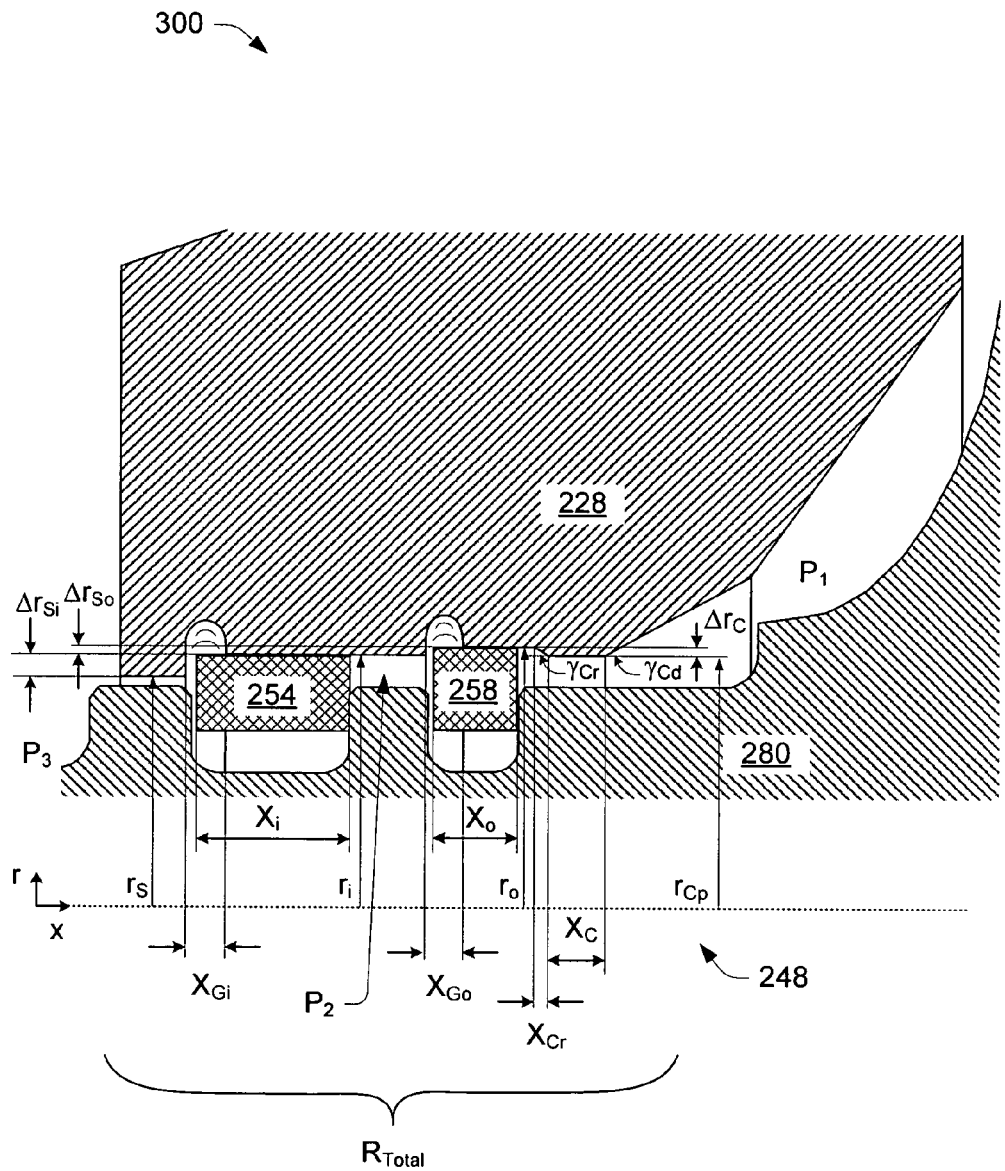
FIG. 3 is a cross-section view of an exemplary seal mechanism for a bore and a shaft.

FIG. 3 shows a cross-section of the exemplary seal mechanism 300 of the turbine bore segment 248 along with seal rings 254, 258 and a shaft 280. In this example, the exemplary seal mechanism 300 includes the seal rings 254, 258, an inner surface of the turbine bore segment 248 (e.g., proximate to a turbine wheel), and an outer surface of the shaft 280 that act together to create resistance to flow. The seal mechanism 300 creates resistance via a tortuous path and reduced flow area, sometimes referred to as a labyrinth seal. In addition, upon seating, wear, heating, etc., of various components of the seal mechanism 300, tortuosity or other properties of the path may change.

The surface of the turbine bore segment 248 includes an outer seat that has a radial depth $\Delta r_{S_o}$ as measured from an inner side step of the outer seat. The inner surface of the turbine bore segment 248 also includes an inner seat that has a radial depth $\Delta r_{S_i}$ as measured from an inner side step of the inner seat. The outer seat receives the outer ring 258 while the inner seat receives the inner ring 254. The outer ring 258 includes an axial width $X_o$, which is less than the axial width of the outer seat and the inner ring 254 includes an axial width $X_i$, which is less than the axial width of the inner seat. Thus, some movement or axial expansion may occur for the rings in their respective seats wherein the inner steps of the seats generally limit inward movement of the rings 254, 258.

In the exemplary bore segment 248, the outer seat includes a groove of axial width $X_{G_o}$ and the inner seat includes a groove of axial width $X_{G_i}$. In general, the axial width of a groove is less than the axial width of a respective ring. In this example, each groove coincides at one axial end with a respective inner side step, which may limit inward axial movement or expansion of a ring.

The exemplary shaft 280 includes an outer slot that substantially coincides with the outer ring 258 and an inner slot that substantially coincides with the inner ring 254. In general, the axial width of a slot exceeds the axial width of a respective ring.

For purposes of explanation, various pressures $P_1$, $P_2$ and $P_3$ are shown wherein $P_1$ represents an exhaust environment pressure, $P_2$ represents an intermediate pressure and $P_3$ represents a lubricant environment pressure. Where $P_1$ exceeds $P_3$, exhaust flow in the direction of $P_1$ to $P_3$ may be expected (e.g., from exhaust environment to lubricant environment) wherein $P_1 > P_2 > P_3$. Where $P_3$ exceeds $P_1$ or where the difference between $P_3$ and $P_1$ is insubstantial (e.g., a few centimeters of water), then lubricant may flow in the direction of $P_3$ to $P_1$. Again, lubricant flow may occur due to capillary and/or other lubricant transport forces (e.g., gravity, etc.). While exhaust flow is typically a more serious concern during turbine operation, the seal mechanism 300 may also act to resist lubricant flow.

As shown in FIG. 3, the inner ring 254 and the outer ring 258 act to create resistances in series, for example, according to the following equation (Eqn. 1):

$$R_{Total} = R_{inner} + R_{outer} + \alpha \qquad (1)$$

where the term $\alpha$ represents other resistances. Depending on values of various parameters, $R_{inner}$ may differ from $R_{outer}$ and, as already mentioned, such values may change during operation.

While the rings 254, 258 of the exemplary mechanism 300 act to increase resistance to flow, for example, compared to a single ring mechanism, the exemplary seal mechanism 300 also includes features that facilitate assembly and/or disassembly of the shaft 280 from the bore 248. A particular feature that facilitates assembly and/or disassembly is a chamfer in the wall of the bore 248, defined in this example by an axial chamfer rise distance $X_{Cr}$ and a chamfer rise angle $\gamma_{Cr}$ which together may determine a radial chamfer distance $\Delta r_C$. A value for an exemplary chamfer rise angle $\gamma_{Cr}$ is optionally between approximately 30° and approximately 50°. While the exemplary chamfer has a substantially linear cross-section, other examples may include chamfers with non-linear cross-section, optionally in combination with linear cross-section. For example, a chamfer may include a curved cross-section.

The distance from the step of the outer seat to the chamfer is optionally selected in combination with an outer ring axial width to allow for adequate excursion of the outer ring in the outer seat during use or operation without having the outer ring reach the chamfer. Of course, the chamfer will offer some resistance to movement of the outer ring toward the turbine end of the bore, which may vary depending on chamfer rise angle, chamfer rise distance, chamfer cross-section, etc.; however, such resistance may typically be overcome during assembly and/or disassembly.

During assembly of the seal mechanism 300, insertion of the outer ring 258 may occur from the turbine side opening of the bore 248 wherein as the outer ring 258 traverses axially away from the turbine side opening it reaches the chamfer. The chamfer allows the ring 258 to expand radially (e.g., by the radial distance $\Delta r_C$) as the outer edge surface of the ring 258 contacts the outer seat.

Of course, in an alternative assembly technique, the ring 258 could be compressed or contracted to a dimension smaller than the smallest chamfer radius (or diameter) and then expand by an amount greater than the radial distance $\Delta r_C$ to meet the inner wall of the bore 248. However, rings typically have a limited range of contraction and expansion and thus according to various examples discussed herein, a chamfer with a small radial distance is often preferred.

During disassembly, radial contraction of the outer ring 258 may occur as the ring 258 traverses axially across the chamfer. Thus, according to the exemplary seal mechanism 300, the ring 258 is typically capable of radial expansion and radial contraction to thereby cooperate with the chamfer and allow for ease of assembly and/or disassembly of the shaft 280 from the bore 248.

The exemplary bore 248 also includes a chamfer plateau having an axial width $X_C$ followed by a second chamfer or conical section of increasing radius. The second chamfer is disposed at an angle $\gamma_{Cd}$, which may differ from the chamfer rise angle $\gamma_{Cr}$. The second chamfer allows for radial expansion or radial contraction of the outer ring 258 upon assembly and/or disassembly.

In the exemplary seal mechanism 300, the chamfer adjacent the outer seat for the outer ring does not interfere with insertion of one or more inner seal rings in the bore segment 248. In the example of FIG. 3, the chamfer plateau and the inner seat have substantially equivalent radii. Thus, the inner ring 254 may traverse the chamfer plateau to be seated in the inner seat. In general, the rings 254, 258 are positioned upon assembly in a manner whereby a clearance exists between a respective ring and an inner step. During use or operation, the clearance may decrease, a ring may contact the inner step and/or the clearance may increase.

With respect to the shaft 280, the exemplary mechanism 300 requires a shaft with two ring slots. In general, the slots are cut in the turbine wheel hub sufficiently inboard of the weld joint to avoid a heat affected zone. In the exemplary mechanism 300, the slots are of different axial widths: a narrower width outer slot and a wider width inner slot. The slots are dimensioned to result in desired side clearances when fitted with their respective seal rings. In various examples, the inner ring is sufficiently wide to prevent installation into the outer slot, which could complicate assembly (i.e., allow for misplacement of the inner ring, etc.). An exemplary relationship between an inner ring axial width $X_i$ and an outer ring axial width $X_o$ is optionally on the order of approximately 1.2 (e.g., where the inner ring axial width is approximately 20% wider than the outer ring axial width).

As described above, the turbine bore segment 248 includes two substantially perpendicular steps that extend radially inward and are adjacent respective seal ring seats. The inner step is optionally machined in the manner of a conventional single-ring seal mechanism. The outer step surface optionally results from machining of a recessed secondary seal bore or outer seat diameter wherein the difference in diameters between the primary bore or inner seat and secondary bore or outer seat provides a necessary step without intruding into the primary bore or inner seat diameter. In various examples, the outer edge of the recessed secondary bore or outer seat is configured as a chamfer of a small enough angle to allow removal of the outer ring.

The axial width of the recess of the outer seat, including the chamfer, is optionally selected to be approximately 80% of the axial width of the inner ring. Such dimensions allow the inner ring to bridge and axially traverse the outer seat and chamfer upon installation of the inner ring wherein a portion of the inner ring retained in the bore outboard of the inner seat and chamfer recess maintains the inner ring at the inner seal bore or inner seat diameter. The axial width of the outer seat or recessed bore, from the inner end of the chamfer to the step of the outer seat, is optionally sized to allow a narrow outer ring to relax and expand out to the outer bore or outer seat diameter. In such an example, the outer seat diameter typically exceeds an inner seat diameter. An exemplary a radial depth $\Delta r_{S_o}$ as measured from an inner side step of the outer seat is optionally on the order of a tenth to several tenths of a millimeter (e.g., approximately 0.1 mm to approximately 0.3 mm).

The expansion of the outer seal ring to the outer seal bore diameter (e.g., seat diameter) has the effect of increasing the installed end gap of the ring. As this gap affects the flow area through and around the ring, it is often desirable to maintain this gap at a minimum typically dictated by necessity to allow for installation and thermal expansion during operation. To compensate for any detrimental effect such an example may have on seal performance, a step gap geometry may be employed in the outer seal ring to increase flow resistance.

As already mentioned, the chamfer can facilitate disassembly of the exemplary seal mechanism. For example, the chamfered outer edge of the outer seat may serve to compress the outer ring as the shaft is withdrawn from the bore.

According to various exemplary mechanisms, during use or operation, a seal ring will typically wear-in under gas loading such that an edge of the ring contacts a step in its seat wherein such contact can serve to limit further wear of a ring.

As discussed with respect to the exemplary mechanism 300, an exemplary bore for a shaft of a turbomachine may include a longitudinal axis extending generally from an inner end to an outer end of the bore, an outer seat disposed proximate to the outer end of the bore at an outer seat radius ($r_o$) for an outer seal ring wherein the outer seat includes an inner end, an outer end, a step at the inner end extending radially inward to a step radius ($r_s$), and a chamfer at the outer end extending radially inward over an outward axial distance to a chamfer plateau radius ($r_{cp}$) and an inner seat disposed inward the outer seat at an inner seat radius ($r_i$) for an inner seal ring wherein the outer seat radius ($r_o$) exceeds the inner seat radius ($r_i$).

As discussed, the inner seat may include an axial width and the outer seat may include an axial width wherein the axial width of the inner seat exceeds the axial width of the outer seat. The inner seat optionally includes a groove adjacent the step of the inner seat and the outer seat optionally includes a groove adjacent the step of the outer seat. A chamfer plateau may be included or refer to a minimum radius of a chamfer. Such a chamfer plateau optionally includes a radius approximately the same as an inner seat radius ($r_i$). In general, an exemplary bore increases in radius axially outward from a chamfer plateau.

As shown in FIG. 3, the outer seal ring 258 is disposed between the step of the outer seat and the chamfer and the inner seal ring 254 is disposed between the step of the inner seat and the step of the outer seat wherein the axial width of the inner seal ring optionally exceeds the axial width from the step of the outer seat to the plateau of the chamfer. In various examples, the axial width of the inner seal ring 254 exceeds the axial width of the outer seal ring 258.

The exemplary bore segment 248 is shown as including a plurality of seal rings and a shaft operably coupled to a turbine wheel wherein the bore, the seal rings and the shaft form a labyrinth seal. An exemplary method includes positioning a plurality of seal rings on a shaft operably coupled to a turbine wheel (e.g., optionally connected, part of the turbine wheel, etc.) and inserting the shaft into a bore via axial inward movement wherein during insertion, an outer seal ring contracts and then expands along a chamfer to, reach an outer seal seat. In this exemplary method, during the insertion, an inner seal ring optionally bridges a seat for an outer seal wherein the seat is disposed between a step and a chamfer. Another exemplary method includes extracting a shaft, operably coupled to a turbine wheel (e.g., optionally connected, etc.), from a bore via outward axial movement wherein the shaft includes a plurality of seal rings and wherein during the extraction, an outer seal ring contracts along a chamfer to reach a chamfer plateau and wherein an inner seal ring bridges a seat for the outer seal ring that is disposed between a step of the seat and the chamfer plateau.

Figure 4A:
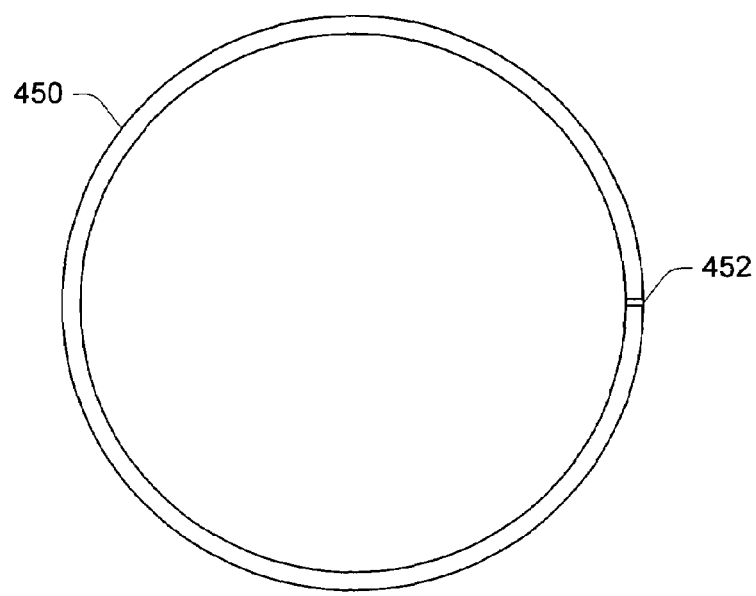
FIG. 4A is a top view of a step gap seal ring and FIG. 4B is a side view of a section of the step gap seal ring.
Figure 4B:
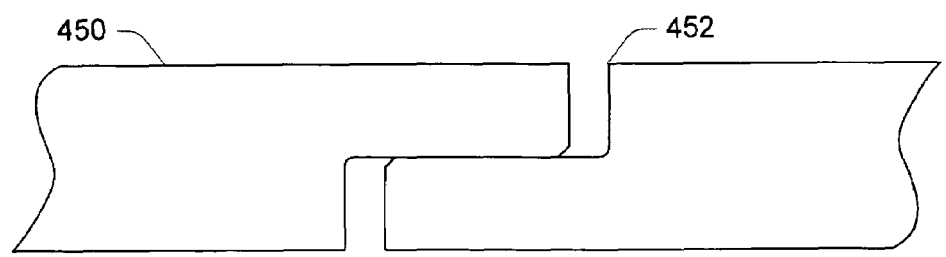

As already mentioned, a ring may employ a step gap geometry. FIG. 4A shows a top view of an exemplary ring 450 that includes a step gap 452 and FIG. 4B shows a side view of a section of the exemplary ring 450 that includes the step gap 452. The exemplary ring 450 is optionally suitable for use as an inner ring, an outer ring and/or an intermediate ring in an exemplary seal mechanism. For example, the ring 450 may be used in the exemplary seal mechanism 300 as the inner ring 254 and/or the outer ring 258. In particular, consider use of the ring 450 as the outer ring 258. In such an example, the step gap 452 allows for radial contraction of the ring to a dimension sufficient to traverse the smallest radius of the chamfer. As the step gap ring traverses the chamfer, the step gap 452 may expand to thereby allow expansion of the ring and seating of the ring in the outer seat.

While a particular step gap is shown in FIG. 4B, other mechanisms that allow for contraction and expansion of a seal ring may also be suitable for use in an exemplary seal mechanism.

Various exemplary seal mechanisms disclosed herein include a chamfer that allows for assembly and/or disassembly of one or more seal rings. This feature allows for ease of checking wear of an outer ring and/or one or more inner rings.

Various exemplary mechanisms optionally include more than one chamfer wherein, for example, each chamfer corresponds to a seal ring and is adjacent a seal ring seat. In one example, an outer chamfer corresponds to an outer ring seat, an intermediate chamfer corresponds to an intermediate ring seat and an inner ring optionally has an axial width selected to bridge an outer seat and an intermediate seat and a minimum diameter approximately equal to or less than the minimum diameter (e.g., chamfer plateau) of the intermediate chamfer to thereby allow the inner ring to be positioned in an inner ring seat.

Various exemplary mechanisms include seal rings of different cross-section. For example, an inner ring may include a sufficiently wider axial dimension than an outer ring thereby allowing it to 'bridge' an undercut bore section or seat for an outer ring. In this manner, the inner ring is able to bypass the inner step of the outer seat during installation, allowing the inner ring to reside in its own seat, which is optionally a conventional seal ring seat.

Various exemplary mechanisms include a chamfer or angled edge rising from an outer seat that optionally acts as part of the outer seat to retain a seal ring during use or operation. The chamfer provides for contraction of the outer ring during disassembly and/or allows for expansion of the outer ring during assembly.

Various exemplary multiple seal ring mechanisms offer improved seal durability (seal ring wear) compared with conventional single-ring mechanisms. An exemplary mechanism includes a wear-limiting step for both an inner ring and an outer ring. While various examples pertain to a turbine end or segment of a bore, such exemplary mechanisms may be suitable for compressor end or segment of a bore to reduce intake air flow to a center housing and/or leakage of lubricant to a compressor housing.

Although some exemplary methods, devices, systems arrangements, etc., have been illustrated in the accompanying Drawings and described in the foregoing Detailed Description, it will be understood that the exemplary embodiments disclosed are not limiting, but are capable of numerous rearrangements, modifications and substitutions without departing from the spirit set forth and defined by the following claims.

What is claimed is:

1. An assembly for a turbocharger comprising:
a labyrinth seal formed by a plurality of slots of a rotatable shaft and a plurality of seal rings, each seal ring received by a respective one of the plurality of slots, the shaft and seal rings positioned in a bore wherein the bore comprises a longitudinal axis extending generally from an inner end to an outer end of the bore and a seat defined inwardly by a step and outwardly by a chamfer that extends radially inward over an outward axial distance to an outer plateau radius of an outer plateau proximate the outer end of the bore where the step resists inward movement of the shaft in the bore and where the chamfer resists outward movement of the shaft in the bore while allowing for removal of the shaft and the plurality of seal rings from the bore via radial contraction of at least one of the seal rings to the radius of the outer plateau as the at least one ring traverses axially across the chamfer.

2. A system for a turbomachine, the system comprising:
a bore that comprises a longitudinal axis extending generally from an inner end to an outer end of the bore, an inner seat disposed proximate to the inner end at an inner seat radius, an outer plateau at an outer plateau radius and an outer seat disposed proximate to the outer end, inward the outer plateau, at an outer seat radius wherein the outer seat radius exceeds the inner seat radius and the outer plateau radius, wherein the inner seat comprises a step that defines an inner end of the inner seat and wherein the outer seat comprises a step that defines an inner end of the outer seat;
a rotatable shaft, insertably positionable in the bore, that comprises an inner slot and an outer slot;
an outer seal ring, positionable on the shaft, configured for receipt by the outer slot and configured to seat in the outer seat of the bore; and
an inner seal ring, positionable on the shaft, configured for receipt by the inner slot, configured with an axial width to bridge the outer plateau and the outer step to prevent seating of the inner seal ring in the outer seat of the bore and configured to seat in the inner seat of the bore wherein the inner seal ring resists axial outward flow of lubricant for lubricating the rotatable shaft.

3. The system of claim 2 wherein the axial width of the inner seal ring exceeds an axial width of the outer seat of the bore.

4. The system of claim 2 further comprising a shaft assembly that comprises the inner seal ring received by the inner slot of the shaft and the outer seal ring received by the outer slot of the shaft.

5. The system of claim 2 further comprising a labyrinth seal that comprises the inner seal ring received by the inner slot of the shaft and seated in the inner seat of the bore and the outer seal ring received by the outer slot of the shaft and seated in the outer seat of the bore.

6. The system of claim 2 wherein the inner step resists axial inward movement of the inner seal ring.

7. The system of claim 2 wherein the outer step resists axial inward movement of the outer seal ring.

8. The system of claim 2 wherein the inner step resists axial inward movement of the inner seal ring and wherein the outer step resists axial inward movement of the outer seal ring.

9. The system of claim 2 wherein the bore comprises a chamfer that extends radially inward over an outward axial distance to the outer plateau radius to resist axial outward movement of the outer seal ring.

10. The system of claim 9 wherein the chamfer allows for removal of the outer seal ring from the outer seat by reducing the radius of the outer seal ring to the radius of the outer plateau upon outward axial movement of the shaft.

11. The system of claim 2 wherein the inner step resists axial inward movement of the inner seal ring and a chamfer that extends radially inward over an outward axial distance to the outer plateau radius wherein the chamfer resists axial outward movement of the outer seal ring.

12. The system of claim 2 wherein the outer seat of the bore comprises a step to resist axial inward movement of outer seal ring and a chamfer that extends radially inward over an outward axial distance to the outer plateau radius to resist axial outward movement of the outer seal ring.

13. A turbocharger comprising:
a compressor comprising a compressor housing and a compressor wheel mounted in the compressor housing;
a turbine comprising a turbine housing and a turbine wheel mounted in the turbine housing;
a rotatable shaft connecting the compressor wheel to the turbine wheel;
a center housing disposed between and mounted to the compressor and turbine housings, the center housing defining a bore that receives the shaft therethrough;
wherein the bore comprises:
a longitudinal axis extending generally from an inner end to an outer end of the bore;
an outer plateau proximate the outer end at an outer plateau radius;

an outer seat disposed inward the outer plateau at an outer seat radius wherein the outer seat comprises an inner end;

an inner seat having an axial width, the inner seat disposed inward the outer seat at an inner seat radius wherein the outer seat radius exceeds the inner seat radius and the outer plateau radius, wherein the inner seat comprises a step that defines an inner end of the inner seat and wherein the outer seat comprises a step that defines the inner end of the outer seat;

and further comprising:

an inner seal ring having an axial width, the inner seal ring disposed inwardly adjacent the inner seat, wherein the axial width of the inner seal ring exceeds an axial width defined between the step of the outer seat and the outer plateau and to thereby allow the inner seal ring to bridge the outer seat and wherein the inner seal ring resists axial outward flow of lubricant for lubricating the rotatable shaft.

* * * * *